United States Patent
Schöttli et al.

(10) Patent No.: US 7,214,053 B2
(45) Date of Patent: May 8, 2007

(54) HOT CHANNEL MULTIPLE INJECTION MOLDING DIE

(75) Inventors: Martin Schöttli, Basadingen (CH); Adrian Christinger, Diessenhofen (CH)

(73) Assignee: Schöttli AG, Diessenhofen (CH)

( * ) Notice: Subject to any disclaimer, the term of this patent is extended or adjusted under 35 U.S.C. 154(b) by 330 days.

(21) Appl. No.: 11/018,080

(22) Filed: Dec. 21, 2004

(65) Prior Publication Data

US 2005/0136152 A1  Jun. 23, 2005

(30) Foreign Application Priority Data

Dec. 23, 2003 (CH) .................................. 2212/03

(51) Int. Cl.
*B29C 45/22* (2006.01)

(52) U.S. Cl. ................. 425/572; 264/328.12; 425/577; 425/588

(58) Field of Classification Search ................ 425/567, 425/572, 588, 577; 264/328.12
See application file for complete search history.

(56) References Cited

U.S. PATENT DOCUMENTS

| 4,184,836 A | | 1/1980 | Rees |
| 6,033,615 A | * | 3/2000 | Bruening ................. 264/328.7 |
| 6,488,413 B1 | * | 12/2002 | Wan ........................... 425/577 |
| 2004/0169318 A1 | * | 9/2004 | Chiba .................... 264/328.12 |

* cited by examiner

*Primary Examiner*—Tim Heitbrink
(74) *Attorney, Agent, or Firm*—Akin Gump Strauss Hauer & Feld LLP

(57) ABSTRACT

In a hot channel multiple injection molding die, the molding spaces (15) for the workpieces are each connected to two injection nozzles (9) and the injection nozzles (9) are each connected to two molding spaces (15). The injection nozzles (9) are arranged between the molding spaces (15). Therefore, a small overall height of the lower die part (1) is produced.

7 Claims, 2 Drawing Sheets

HOT CHANNEL MULTIPLE INJECTION MOLDING DIE

BACKGROUND OF THE INVENTION

The present invention relates to a hot channel multiple injection molding die, particularly for use in manufacturing thin-walled, tubular workpieces.

The injection molding of thin-walled, tubular workpieces, such as disposable syringe cylinders, tampon applicators, tubes, etc., is usually performed through axial or radial introduction of the liquid plastic into the molding space with a heated injection nozzle arranged in an axial or radial direction. However, the axial arrangement has the disadvantage that the die is very long. Therefore, dies are also already known with injection from the side, as disclosed in U.S. Pat. No. 4,184,836. The lateral injection into the molding space requires either an asymmetric die shape, which often cannot uniformly distribute the plastic or cannot prevent bending of the mold core due to the injection and/or back pressure and non-uniform heat distribution in the cavity.

BRIEF SUMMARY OF THE INVENTION

An object of the present invention is to create a hot channel multiple injection molding die, with which thin-walled, tubular workpieces are injection moldable at two positions by hot channel nozzles.

This object is achieved by a hot channel multiple injection molding die for manufacturing thin-walled, tubular workpieces, comprising a first, lower die part having molding spaces forming outer contours of the workpieces and a second, upper die part having molding cores corresponding to the molding spaces, injection nozzles with injection-molding channels which are connected to the molding spaces, and means for cooling the molding spaces, wherein each injection nozzle is connected to two molding spaces and each molding space is connected to two injection nozzles.

The arrangement of the injection nozzles and the heated injection molding channels between the molding spaces and the connection of each injection nozzle to the two adjacent molding spaces leads to uniform injection of the plastic into the molding spaces and also to a uniform distribution of the heat output by the injection nozzles within the die. Thus, relative to the diameter, very long workpieces can also be injection-molded without difficulty.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
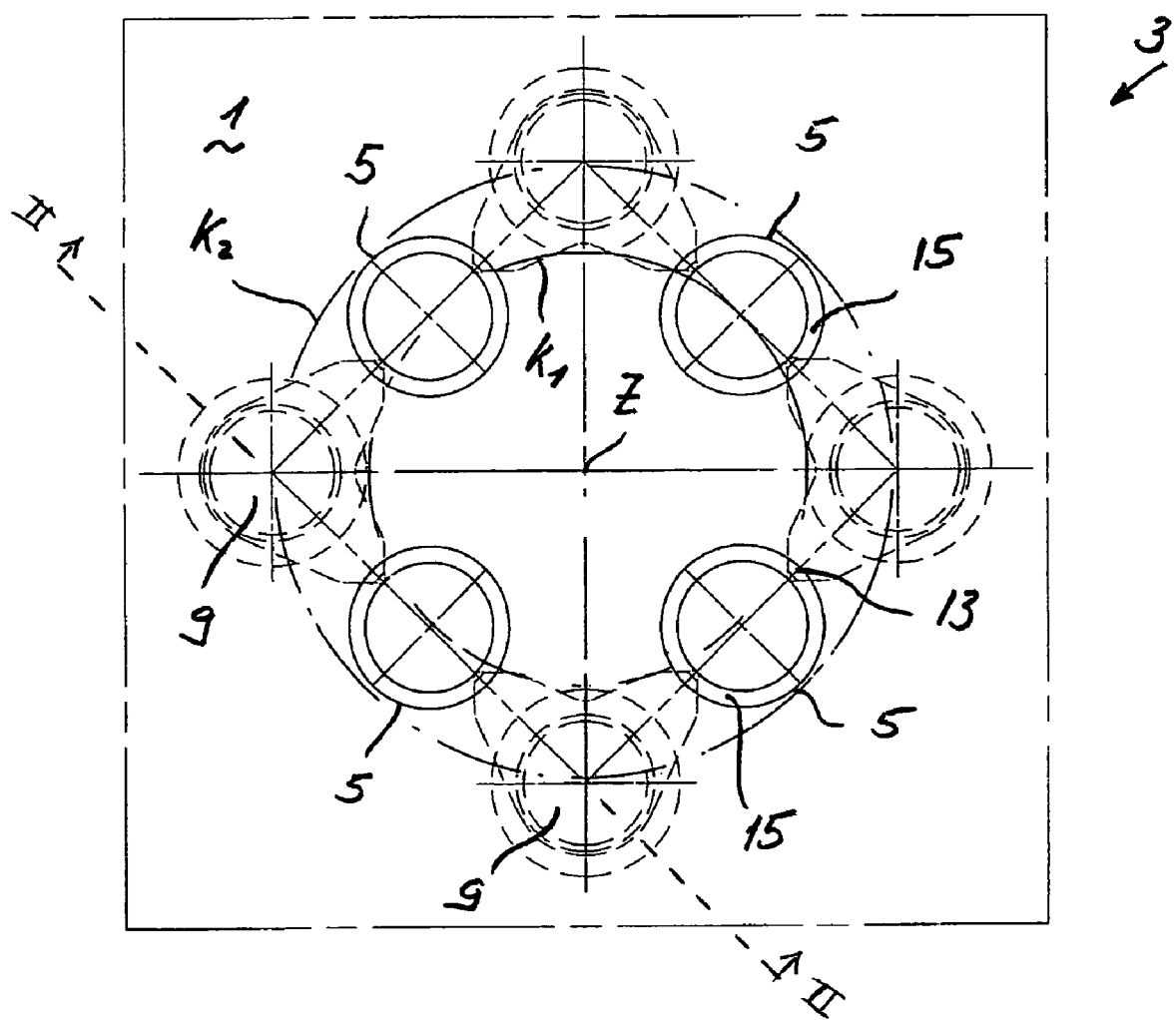
FIG. 1 is a plan view of a stationary die part with injection nozzles according to the invention.
Figure 2:
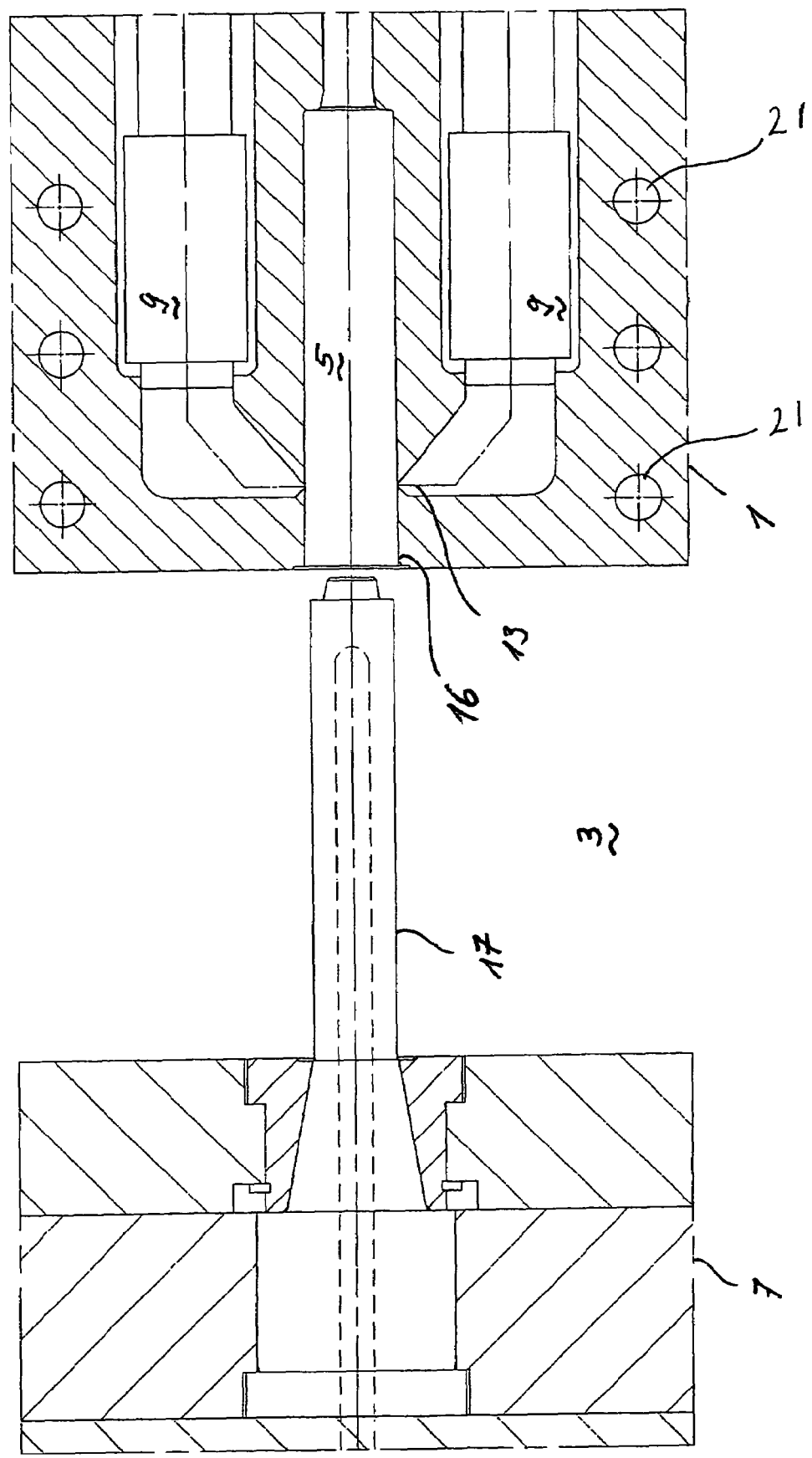
FIG. 2 is a sectional view along line II-II in FIG. 1 through both die parts.

In the top view of the lower die part 1 forming the stationary quadruple injection molding die 3, four cavities 5 for manufacturing elongated, tubular workpieces can be seen around the center Z. These cavities are arranged on a first circle $K_1$ concentric to the center Z. On a second circle $K_2$ concentric to the center Z, four injection nozzles 9 are employed, which are connected to a common central feed line (not shown) for liquid plastic. Each of the injection nozzles 9 is connected via a nozzle channel 13 to the two adjacent molding spaces 15 for the workpieces. The injection positions at the molding spaces 15 lie diagonal to the axis of symmetry of the molding spaces 15 and in the illustrated embodiment lie underneath the edge 16 of the open side of the workpiece.

In this manner, the injection molding of the liquid plastic takes place symmetrically. Consequently, the heating and pressure forces exerted by the plastic on the mandrel or core 17, which is fixed on an upper die part 7 and projects into the molding space 15, also proceeds with the mandrel being supported so that it floats or is even held on its diameter. Therefore, shifting of the mandrel 17 caused by the pressure force or heat expansion can be prevented. Not only is the injection of the liquid plastic performed symmetrically, but the heating of the lower die part 1 and the cooling also take place within the die 1 completely symmetrically in terms of the cavities 5. Cooling means for the die are provided by channels 21 in the lower die part for flowing cooling fluid therethrough.

The arrangement of the injection nozzles 9 together with its heating device 19 next to the cavities 5 for the workpieces leads to an extremely small overall height of the lower die part.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hot channel multiple injection molding die for manufacturing thin-walled, tubular workpieces, comprising a first, lower die part (1) having molding spaces (15) forming outer contours of the workpieces and a second, upper die part (7) having molding cores (17) corresponding to the molding spaces (15), injection nozzles (9) with injection-molding channels (13) which are connected to the molding spaces (15), and means for cooling the molding spaces (15), wherein each injection nozzle (9) is connected to two molding spaces (15) and each molding space (15) is connected to two injection nozzles (9).

2. The hot channel multiple injection molding die according to claim 1, wherein the injection nozzles (9) and the molding spaces (15) are arranged on concentric circles ($K_1$, $K_2$).

3. The hot channel multiple injection molding die according to claim 1, wherein the injection nozzles (9) lie between two adjacent molding spaces (15).

4. The hot channel multiple injection molding die according to claim 2, wherein the injection nozzles (9) lie between two adjacent molding spaces (15).

5. The hot channel multiple injection molding die according to claim 1, wherein the nozzle channels (13) of the injection nozzles (9) open into the molding spaces (15) substantially diagonally opposite each other.

6. The hot channel multiple injection molding die according to claim 2, wherein the nozzle channels (13) of the injection nozzles (9) open into the molding spaces (15) substantially diagonally opposite each other.

7. The hot channel multiple injection molding die according to claim 3, wherein the nozzle channels (13) of the injection nozzles (9) open into the molding spaces (15) substantially diagonally opposite each other.

* * * * *